(12) United States Patent
Pozhidaev

(10) Patent No.: US 8,923,269 B2
(45) Date of Patent: Dec. 30, 2014

(54) PRECISE INTERVAL TIMER FOR SOFTWARE DEFINED RADIO

(75) Inventor: Aleksey Pozhidaev, Longmont, CO (US)

(73) Assignee: Lexycom Technologies Inc., Longmont, CO (US)

( * ) Notice: Subject to any disclaimer, the term of this patent is extended or adjusted under 35 U.S.C. 154(b) by 109 days.

(21) Appl. No.: 13/535,047

(22) Filed: Jun. 27, 2012

(65) Prior Publication Data

US 2013/0016713 A1    Jan. 17, 2013

Related U.S. Application Data

(60) Provisional application No. 61/572,033, filed on Jul. 11, 2011.

(51) Int. Cl.
| | | |
|---|---|---|
| *H04J 3/06* | (2006.01) | |
| *G06F 1/00* | (2006.01) | |
| *H04L 7/04* | (2006.01) | |

(52) U.S. Cl.
CPC ............... *H04J 3/06* (2013.01); *H04J 3/0694* (2013.01); *G06F 1/00* (2013.01); *H04L 7/04* (2013.01)

USPC .......................................... 370/347; 370/470

(58) Field of Classification Search
USPC .................................. 370/347, 498, 337, 470
See application file for complete search history.

(56) References Cited

U.S. PATENT DOCUMENTS

| | | | | |
|---|---|---|---|---|
| 5,812,833 | A * | 9/1998 | Goler et al. ................... | 713/502 |
| 5,978,927 | A * | 11/1999 | Curry et al. ................... | 713/502 |
| 8,327,357 | B2 * | 12/2012 | Amsden ........................... | 718/1 |
| 8,335,240 | B2 * | 12/2012 | Boduch ......................... | 370/503 |
| 2002/0088003 | A1* | 7/2002 | Salee .............................. | 725/111 |
| 2004/0230673 | A1* | 11/2004 | Lange-Pearson et al. .... | 709/223 |
| 2005/0141478 | A1* | 6/2005 | Ho ................................. | 370/350 |
| 2011/0055828 | A1* | 3/2011 | Amsden ........................... | 718/1 |
| 2011/0286560 | A1* | 11/2011 | Pignatelli ...................... | 375/356 |

* cited by examiner

*Primary Examiner* — Brian D Nguyen

(57) ABSTRACT

A precise digital fractional interval timer for software defined radios which vary their waveform on a packet-by-packet basis. The timer allows for variable length in the preamble of the RF packet and allows to adjust boundaries of the TDMA (Time Division Multiple Access) Slots of the receiver of an SDR based on the reception of the RF packet of interest.

15 Claims, 4 Drawing Sheets

PRECISE INTERVAL TIMER FOR SOFTWARE DEFINED RADIO

REFERENCE TO RELATED APPLICATIONS

This patent application claims the benefit of U.S. Provisional Application No. 61/572,033 filed on Jul. 11, 2011, the disclosure of which is incorporated herein by reference in its entirety.

GOVERNMENT LICENSE RIGHTS

This invention was made with government support under contract# NNX09CB44C awarded by NASA. The government has certain rights in the invention.

BACKGROUND OF THE INVENTION

1. Field of the Invention

This invention relates generally to radio communications, and relates more particularly to software defined radios, and more specifically to an interval timer for software defined radios which vary their waveform on a packet-by-packet basis.

2. Description of Related Art

The functions of the majority of the conventional radios available in the marketplace today are hardware dependent. Often times these radios cannot be reconfigured, adjusted, or fine-tuned.

The constraint being that once such a radio is delivered to the end-user, the radio's functionality has already been locked in and predetermined. Once a hardware based radio system such as this is deployed, it can be very difficult to enhance, modify, or upgrade the technology.

Hence, software defined radios address the need for flexibility. Additionally, some of the software defined radios have capability to operate in the Networks based on Time Division Multiple Access (TDMA) protocols. Moreover, some of TDMA Networks require the RF packets structure to vary on a packet-by-packet basis.

Such variations include, but are not limited to, the modulation types used within each RF packet and data rates of each packet.

The TDMA system, usually, consists of a Master radio and the Remote units. The Remote units are expected to synchronize their TDMA Slot boundaries to the Master's timing. With waveform variations from packet-to-packet, Slot boundary adjustments become computationally expensive task that requires precise interval timer apparatus.

The proposed invention allows for a simple solution to the problem of generating precise time intervals for SDR (Software Defined Radios) operating in TDMA system(s) if the system's Slots vary in duration and the RF packets structure changes on packet-by-packet basis.

SUMMARY OF THE INVENTION

The present invention is aimed to improve the re-configurability/flexibility characteristics of a software defined radio.

The object of the present invention is aimed to improve the ability of the SDR to maintain proper Slot timing in cases when the fixed clock ratio timer is not usable and/or when the TDMA Slots durations vary from slot to slot.

The proposed invention also allows for precise slot boundary adjustments of SDRs within a TDMA system that varies its waveforms on a packet-by-packet basis.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

Figure 1:
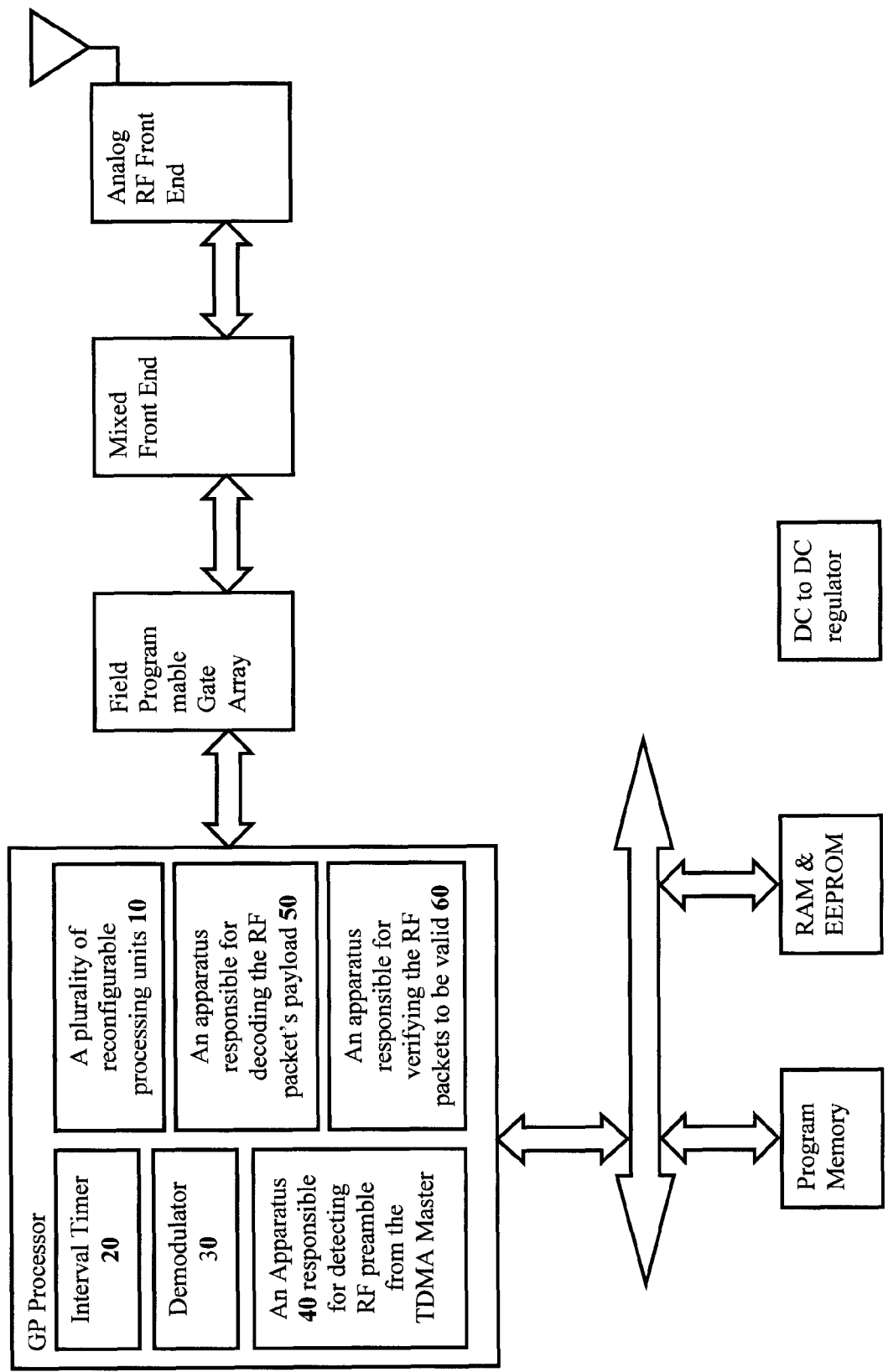
FIG. 1 is a block diagram showing interconnection of SDR incorporating the proposed interval timer according to the embodiment of the invention.

For simplicity and clarity of illustration, the drawing figures illustrate the general manner of construction, and descriptions. Details of well-known features and techniques may be omitted to in order to avoid making drawing overly complex.

The same reference numerals in different figures denote the same elements.

The terms "first", "second", "third", and the like in description and in the claims, if any, are used for describing a particular sequential or chronological order. It is understood that the terms so used are interchangeable under appropriate circumstances such that the embodiments of the invention described herein are, for example, capable of operation in sequences other than those illustrated or otherwise described herein. Furthermore, the terms "comprise", "include", "have", and any variations thereof, are intended to cover a nonexclusive inclusion, such that a process, method, article, or apparatus that comprises a list of elements is not necessarily limited to those elements, but may include other elements not expressly listed or inherent to such process, method, article, or apparatus.

DESCRIPTION OF THE PREFERRED EMBODIMENT

Hereinafter embodiments of the invention will be described in reference to the drawings.

Referring to FIG. 1, there is disclosed a high-level block diagram of a standalone complete miniature multiservice reconfigurable software defined radio (SDR) 1. It is assumed that such SDR would participate in a TDMA Network and needs to adjust its timing according to the timing used by the TDMA Master. It is also assumed that the TDMA Network varies the waveform used by the RF packets from Slot to Slot.

The proposed software defined radio (SDR) 1 incorporating the proposed interval timer 20 of the present invention comprises the proposed interval timer 20 responsible for generating accurate time slot intervals used by the SDR to track TDMA Slot boundaries. As shown in FIG. 1, the SDR 1 further comprises an apparatus 30 responsible for demodulation of the received RF signal; an apparatus 40 responsible for detecting RF preamble within the demodulated received RF signal; an apparatus 50 responsible for decoding the RF packet's payload; and an apparatus 60 responsible for verification of the RF packet's said payload, as well as a plurality of reconfigurable processing units 10.

Figure 2:
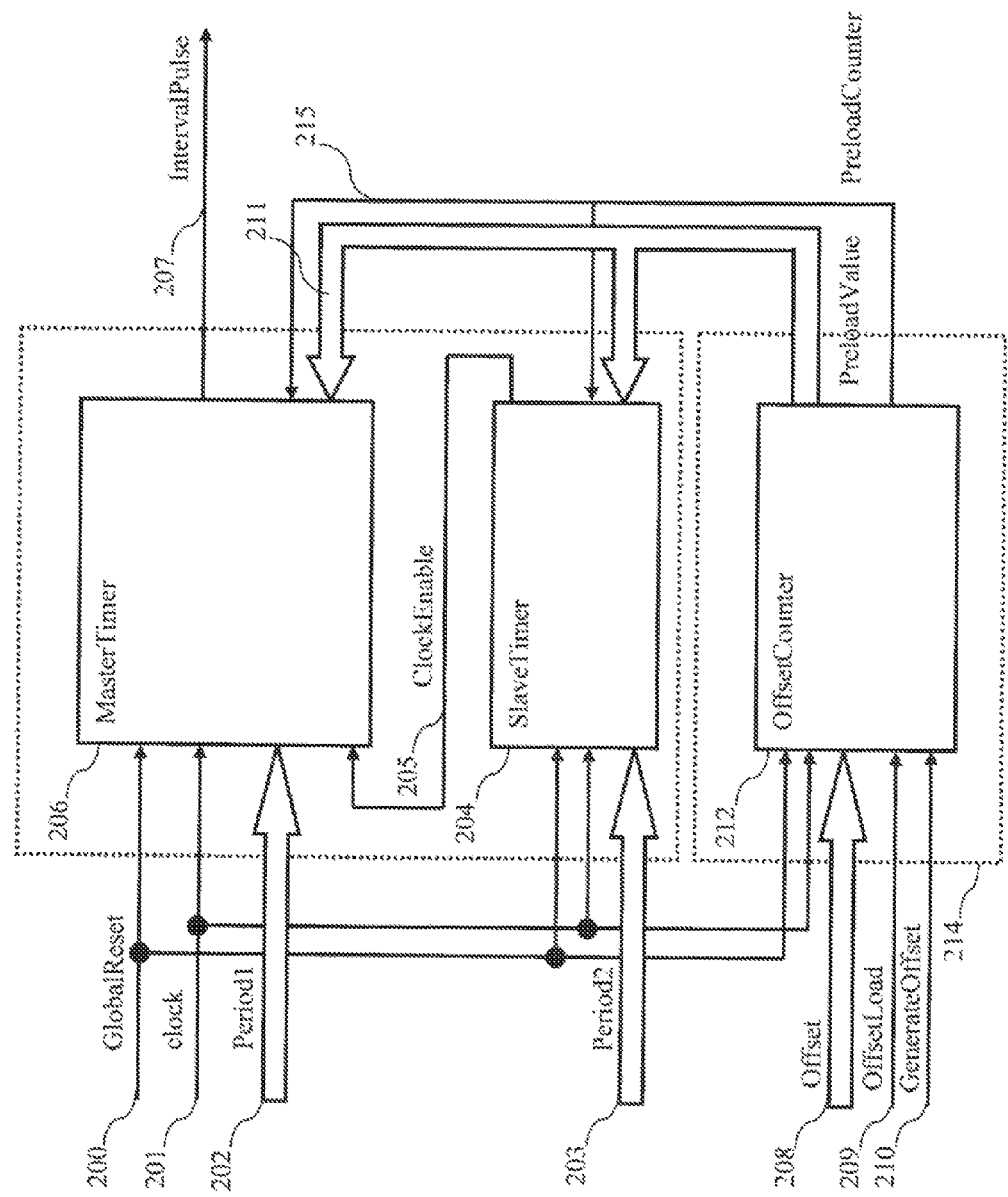
FIG. 2 is a block diagram of the proposed interval timer according to the embodiment of the invention.

Referring to FIG. 2 there is disclosed a proposed interval timer 20 according to an embodiment of the present invention. The proposed timer allows the SDR to generate pulses on an IntervalPulse line 207 at the frequency that is equal to the frequency of the clock divided by a fractional divider. To accomplish this, a two-timer master-slave arrangement is used. The interval timer 20 comprises a master timer 206 and a slave timer 204. The master timer (MasterTimer) 206 is a pulse counter programmed with Period1 202. The slave timer (SlaveTimer) 204 is a pulse counter programmed with the value of Period2 203.

Every time SlaveTimer 204 counts up to the value of Period2 programmed into it, it de-asserts the ClockEnable line 205 controlling the MasterTimer 206. More specifically, every time SlaveTimer 204 counts up to the value of Period2, the ClockEnable line 205 on its output goes negative preventing the MasterTimer 206 from incrementing its count during the corresponding clock pulse.

Hence, the MasterTimer 206 skips some of the clock 201 cycles depending on the Period2 value loaded into the SlaveTimer 204.

Such pulse skipping allows to achieve a fractional frequency of pulses generated on the IntervalPulse line 207. Additionally, loading the SlaveTimer 204 and the MasterTimer 206 with different Period1 and Period2 values before the beginning of each TDMA Slot allows to vary the SDR's time interval values from Slot to Slot.

The proposed interval timer 20 further comprises an OffsetCounter 212 which is used to shift in time pulses generated by the MasterTimer 206 on the IntervalPulse line 207.

When the apparatus 40 of the SDR detects an RF preamble coming from a TDMA Master, the SDR then generates a pulse on the OffsetLoad line 209. This pulse loads an Offset value 208 into the OffsetCounter 212. In turn, the OffsetCounter 212 propagates the Offset value 208 to a PreloadValue bus 211.

After the RF preamble is detected, the SDR 1 begins receiving the rest of RF packet. If the content of the RF packet appears to be valid (such as it passed data integrity test, etc.) verified by apparatus 60, the SDR will generate a pulse on a GenerateOffset line 210.

This allows OffsetCounter 212 to signal the pulse counters 206 and 204 to reset their current values to values presented on the PreloadValue bus 211. Such load sets the MasterTimer 206 and the SlaveTimer 204 to generate next pulse on the IntervalPulse line 207 to be aligned with TDMA Slot boundaries that are used by an SDR whose RF packet was received.

Figure 3:
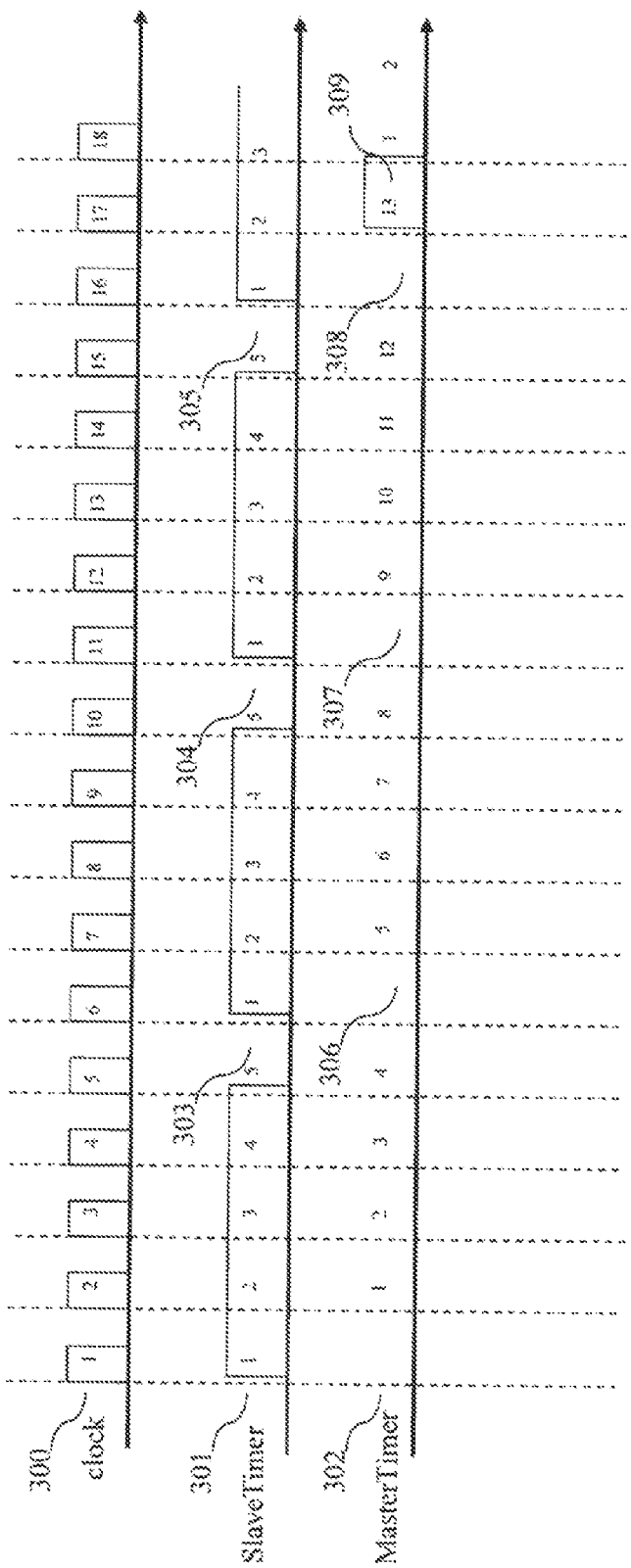
FIG. 3 is a timing diagram explaining the functionality of fractional frequency interval timer according to the embodiment of the invention.

FIG. 3 is a timing diagram explaining the functionality of fractional frequency interval timer according to the embodiment of the invention. As shown in FIG. 3, the MasterTimer 302 skips some of the clock 300 cycles depending on the Period2 value loaded into the SlaveTimer 301. In this example, the Period2 value is five, at every fifth cycle such as 303, 304, 305, it prevents the MasterTimer 302 from incrementing its count, thus the MasterTimer 302 skips a cycle such as 306, 307, and 308 for every five cycles of the clock 300 cycles.

Figure 4:
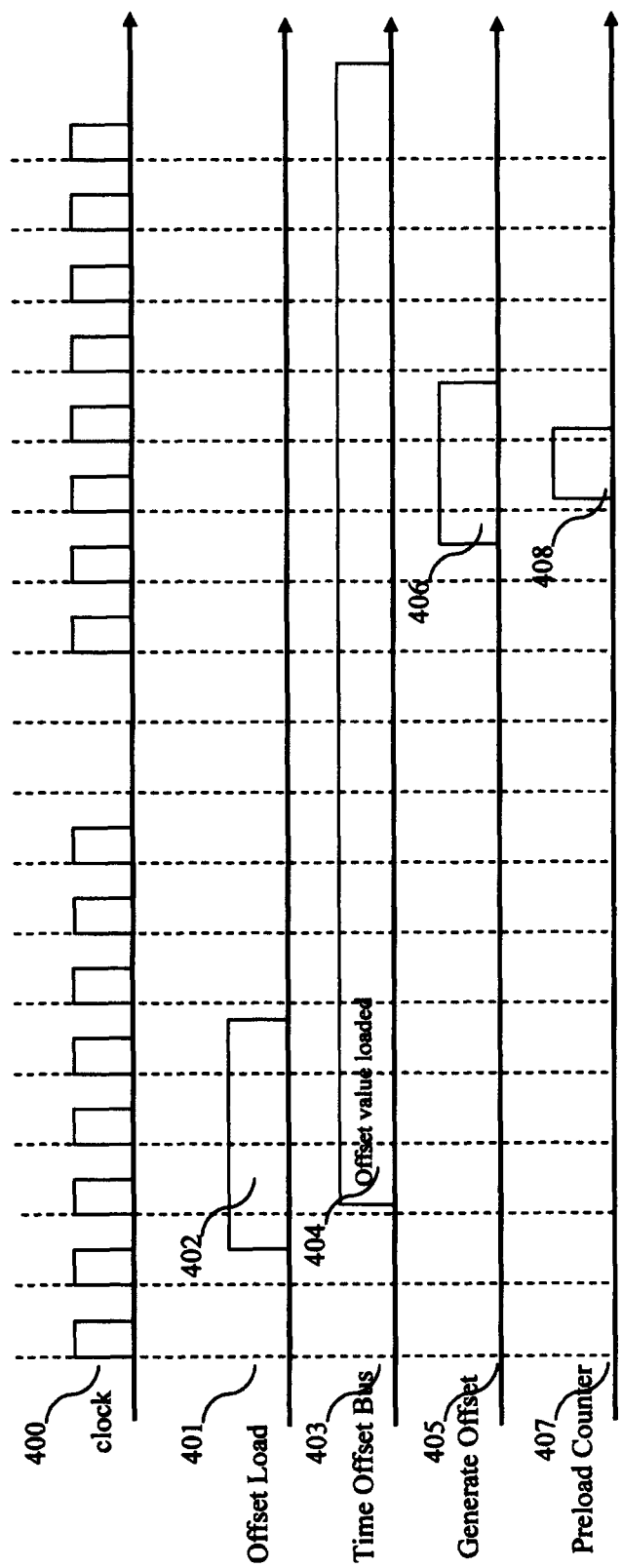
FIG. 4 is a timing diagram explaining the functionality of the proposed timer with respect to remembering when the RF preamble was detected and precisely adjusting the TDMA Slot boundaries in accordance with the expected duration of the RF preamble.

FIG. 4 is a timing diagram explaining the functionality of the proposed timer with respect to remembering when the RF preamble was detected and precisely adjusting TDMA Slot boundaries in accordance with expected duration of the RF preamble.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are entitled.

What is claimed is:

1. A precise interval timer for software defined radios (SDRs) which vary their waveform on a packet-by-packet basis comprising:
    a MasterTimer which is a pulse counter programmed with Period1, the MasterTimer being controlled by a ClockEnable line;
    a SlaveTimer which is a pulse counter programmed with Period2, the SlaveTimer controlling the MasterTimer by the ClockEnable line;
    an OffsetCounter which is used to offset counters of the MasterTimer and the SlaveTimer;
    an IntervalPulse line which is coupled to the MasterTimer;
    a GlobalReset line which is coupled to the MasterTimer, the SlaveTimer, and the OffsetCounter and which is used to reset all said counters;
    an Offset, an OffsetLoad, and a GenerateOffset which are inputs of the OffsetCounter, the OffsetCounter being programmed with the Offset value when the OffsetLoad is asserted; and
    a PreloadCounters and a PreloadValue which are outputs of the OffsetCounter and which are connected to the MasterTimer and to the SlaveTimer.

2. The precise interval timer for SDRs of claim 1 wherein every time when the SlaveTimer counts up to the value of Period2 programmed into it, the SlaveTimer de-asserts the ClockEnable line controlling the MasterTimer which in turn skips some cycles of a clock depending on the Period2 value loaded into the SlaveTimer, whereby the Master Timer generates pulses on the IntervalPulse line at frequency fractional to the frequency of the clock.

3. The precise interval timer for SDRs of claim 1 wherein when the SDR detects a radio frequency (RE) packet, the OffsetCounter signals the MasterTimer and the SlaveTimer to reset their current value so the next pulse on the IntervalPulse line is generated precisely at the same time as the corresponding pulse that is used by a radio that sent the RF packet.

4. The precise interval timer for SDRs of claim 1 allows for varying the SDR's interval values from slot to slot.

5. The interval timer for SDRs of claim 1 allowing for adjusting boundaries of their Time Division Multiple Access (TDMA) slots based on reception of an RF packet of interest.

6. The interval timer for SDRs of claim 1 generating precise time intervals for SDRs operating in TDMA systems of which slots vary in duration and an RF packets structure changes on packet-by-packet basis.

7. The interval timer for SDRs of claim 1 allowing the SDR to generate interval pulses at a frequency that is equal to a frequency of a clock divided by a fractional divider.

8. The interval timer for SDRs of claim 1 allowing the SDR to adjust TDMA slot boundaries internally generated by the SDR to match slot boundaries of a radio transceiver whose RF packet was decoded.

9. A software defined radio (SDR), comprising:
a plurality of reconfigurable processing units;
a clock;
an interval timer responsible for generating accurate time slot intervals used by the SDR to track TDMA Slot boundaries, the interval timer being coupled to the reconfigurable processing units;
an apparatus responsible for demodulation of a received RF packet (Demodulator), the Demodulator being coupled to the interval timer;
an apparatus responsible for detecting a preamble and a payload within the received RF packet (Detector), the Detector being coupled to the Demodulator and to the interval timer;
an apparatus responsible for decoding the received RF packet's payload (Decoder), the Decoder being coupled to the Demodulator and to the Detector; and
an apparatus responsible for verification of the received RF packet's payload, said apparatus responsible for verification being coupled to the Demodulator.

10. The SDR of claim 9 wherein said interval timer generates time Intervals at frequency fractional to the frequency of a clock in the SDR.

11. The SDR of claim 9 wherein said interval timer generates time intervals at duration that vary from one TDMA slot to the next.

12. The SDR of claim 9 wherein said interval timer has an apparatus allowing it to memorize a time instance when RF preamble was detected.

13. The SDR of claim 9 wherein said interval timer has an apparatus allowing it to adjust TDMA slot boundaries internally generated by the SDR to match TDMA slot boundaries of a radio transceiver whose RF packet was decoded.

14. The SDR of claim 9 wherein the interval timer has two pulse counters, one being a MasterTimer and the other being a SlaveTimer, every time when the SlaveTimer counts up to a value of Period2 programmed into it, the SlaveTimer de-asserts a ClockEnable line controlling the MasterTimer which in turn skips some cycles of the clock depending on the Period2 value loaded into the SlaveTimer, whereby the MasterTimer generates time intervals at frequency fractional to the frequency of the clock.

15. The SDR of claim 14 wherein the interval timer further has an OffsetCounter wherein when the apparatus for detecting RF preamble detects preamble within a demodulated RF packet and an apparatus for verification of the RF packet's payload verifies the RF packet is valid, the OffsetCounter signals the pulse counters within the interval timer to reset their current value so the next pulse on an IntervalPulse line is generated precisely at the same time as TDMA slot boundaries that are used by a radio transceiver whose RF packet was decoded.

* * * * *